United States Patent [19]
Walton et al.

[11] Patent Number: 4,491,308
[45] Date of Patent: Jan. 1, 1985

[54] DOOR FINISHING SUPPORT STRUCTURE

[76] Inventors: Robert N. Walton; Ralph C. Pinto, both of P.O. Box 564, Big Pine, Calif. 93513

[21] Appl. No.: 438,911

[22] Filed: Nov. 3, 1982

[51] Int. Cl.³ .............................................. B23Q 1/04
[52] U.S. Cl. .................................... 269/70; 269/296; 269/905
[58] Field of Search ....................... 269/53, 67, 69, 70, 269/97, 296, 905; 211/11, 49 R, 194

[56] References Cited

U.S. PATENT DOCUMENTS 2,046,095  6/1936  Shaw .................................. 211/194
2,955,632 10/1960  Stone .................................. 269/296

Primary Examiner—Frederick R. Schmidt
Assistant Examiner—Judy J. Hartman
Attorney, Agent, or Firm—Harvey B. Jacobson

[57] ABSTRACT

A pair of horizontally elongated support structures is provided for supporting a horizontal panel member from opposite marginal edges thereof. The support structures each include an elongated horizontal member defining a central area for abutting, extending along and removable anchoring to one marginal edge of an associated panel member and upper and lower opposite marginal edges disposed above and below the central area thereof and the opposite marginal edges define a ridge extending along one marginal edge and a groove or trough extending along the other marginal edge. Accordingly, when the support structures are used in pairs of support structures with each pair supporting a horizontal door or other panel between the central areas thereof the ridges and troughs of vertically stacked support structures may be engaged with each other in order to support the panel members in horizontal, vertically spaced and stacked relation. In addition, each of the central areas includes a horizontal shank portion centrally intermediate its opposite ends and a pair of stands are provided including lower ends for support from a horizontal support surface and upper ends defining journals from which the shank portions may be removably journalled.

1 Claim, 5 Drawing Figures

DOOR FINISHING SUPPORT STRUCTURE

BACKGROUND OF THE INVENTION

Doors and other panel members often need to be sanded, sealed, stained or painted and these tasks require that the doors or panel members to have such work performed thereon be properly supported. In addition, if a plurality of doors or panels are to have such tasks performed thereon, a need exists for supporting a plurality of the doors or panels in a compact state while a given task is being carried out on the plurality of doors or panels and before the next task to be performed is started.

Examples of support structures including some of the general structural and operational features of the instant invention are disclosed in U.S. Pat. Nos. 1,769,511, 2,955,632, 3,625,504, 3,807,720 and 4,239,197.

BRIEF DESCRIPTION OF THE INVENTION

The support structures of the instant invention comprise elongated horizontal members which may extend along and be anchored relative to remote marginal portions of a horizontally disposed door. The support members include upper and lower marginal edges which are spaced above and below the associated door and define longitudinally extending ridges and troughs. The troughs of one pair of support members engaged with a first door may have the ridges of a second pair of support members engaged with a second door supported therefrom, whereby the doors may be supported in horizontally spaced apart relation relative to each other and from a horizontal support surface.

The invention also includes a pair of stands whose lower ends may be supported from horizontal support surface and whose upper ends include journal portions. The horizontally elongated support members include laterally outwardly projecting shank portions centrally intermediate their opposite ends and the shank portions may be rotatably supported in the aforementioned journal portions. Accordingly, a single pair of stands may be used to support a single door having a refinishing task being performed thereon and each single door may be supported in horizontally spaced stacked relation above a similarly supported door after the refinishing task has been performed.

The main object of this invention is to provide support structure whereby a panel member such as a door may be supported in convenient position to have a refinishing operation performed thereon.

Another object of this invention is to provide support structure whereby after a door has had a refinishing operation performed thereon that door may be supported in space stacked relation relative to other doors having had the same refinishing operation performed thereon.

Another important object of this invention is to provide support structure which may be utilized to support numerous different types of panel members to have refinishing operations performed thereon.

Another object of this invention is to provide a door or panel support structure in accordance with the preceding objects and which may be used to support a door or panel member in various different positions.

A final object of this invention to be specifically enumerated herein is to provide a panel support structure in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
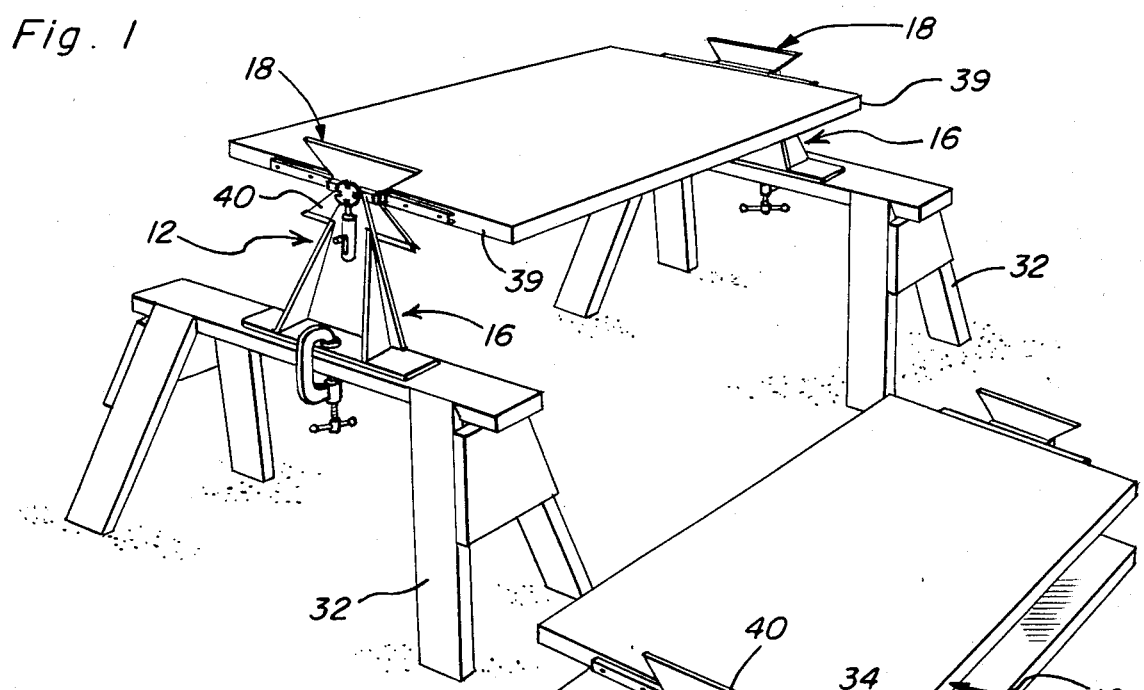
FIG. 1 is a perspective view of a plurality of panels supported in horizontal position through utilization of the support structure of the instant invention and with one of the panels supported in elevated position from a pair of saw horses and two other panels supported in spaced stacked relation.
Figure 5:
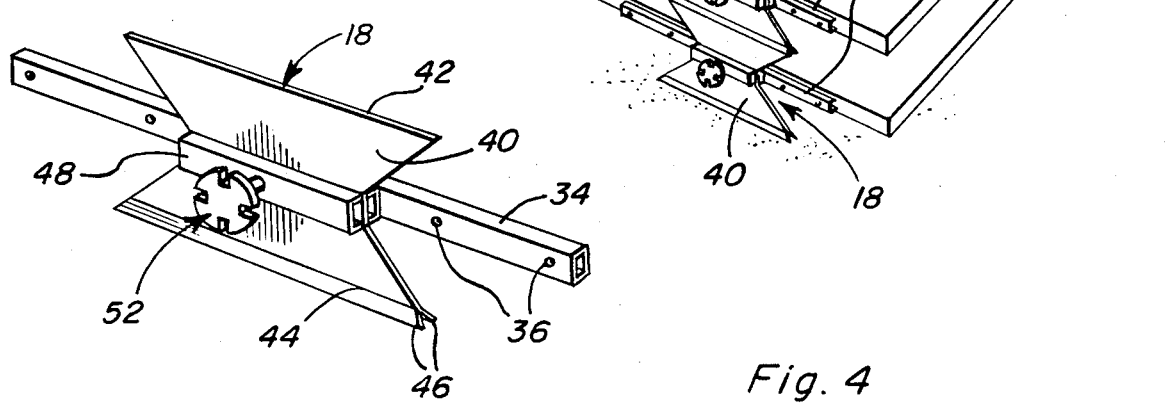
FIG. 5 is a perspective view of one of the elongated members comprising a part of the support structure and adapted to be anchored relative to one marginal edge of an associated panel member.

Referring now more specifically to the drawings, the numeral 10 generally designates a plurality of panel members such as doors which are to have refinishing or other operations performed thereon. The support structure of the instant invention to be used in supporting a panel member is referred to in general by the reference numeral 12 and includes a pair of stands each referred to in general by the reference numeral 16 and a plurality of pairs of elongated members each referred to in general by the reference numeral 18.

Each of the stands 16 comprises an upstanding panel member 20 having a lower laterally outwardly projecting horizontal flange 22 supported from its lower marginal edge portion. A plurality of gusset plates 24 extend and are interconnected between the outer side of each panel member 20 and the upper surface of the corresponding horizontal flange 22. The components 20, 22 and 24 may be integrally formed of plastic, if desired, or constructed of metal panels suitably joined as by welding.

Figure 2:
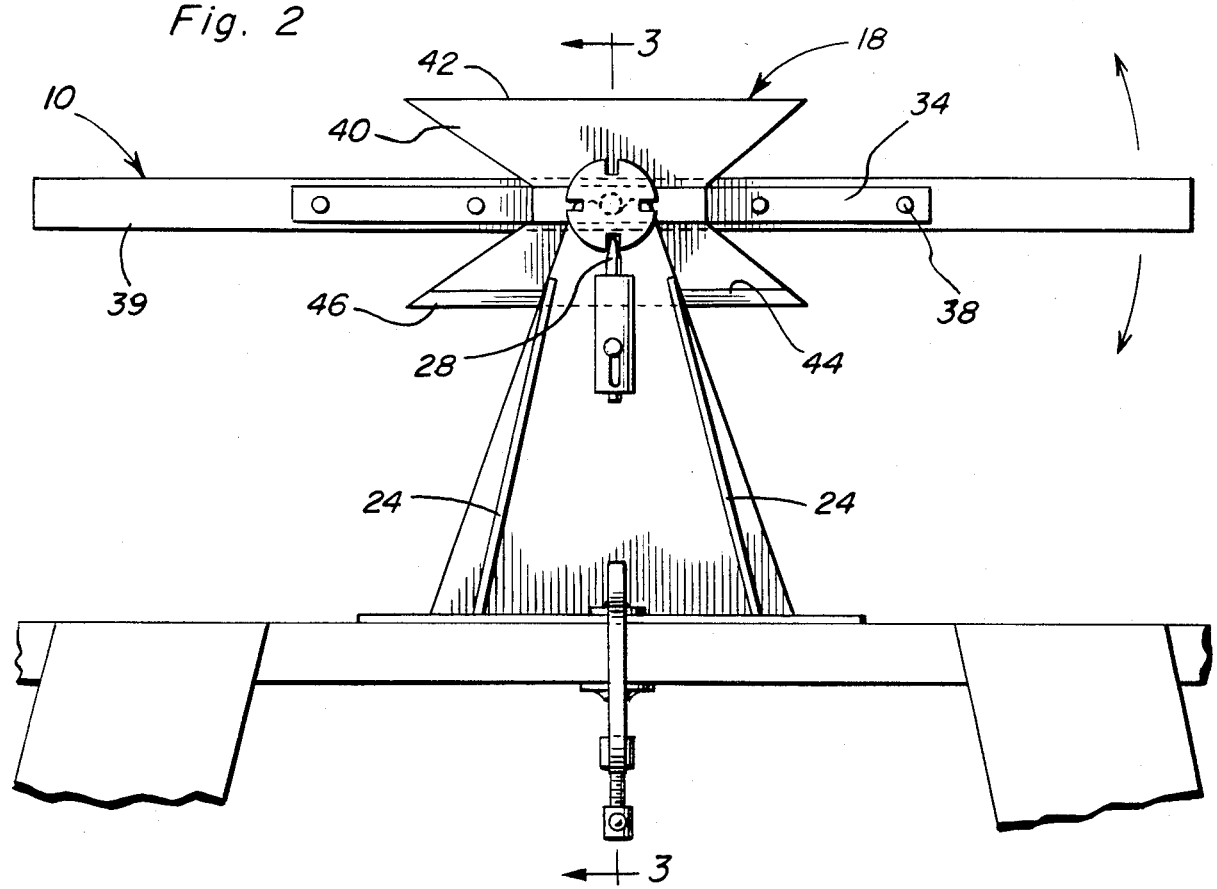
FIG. 2 is an enlarged fragmentary elevational view of the upper left hand portion of the assembly illustrated in FIG. 1.
Figure 3:
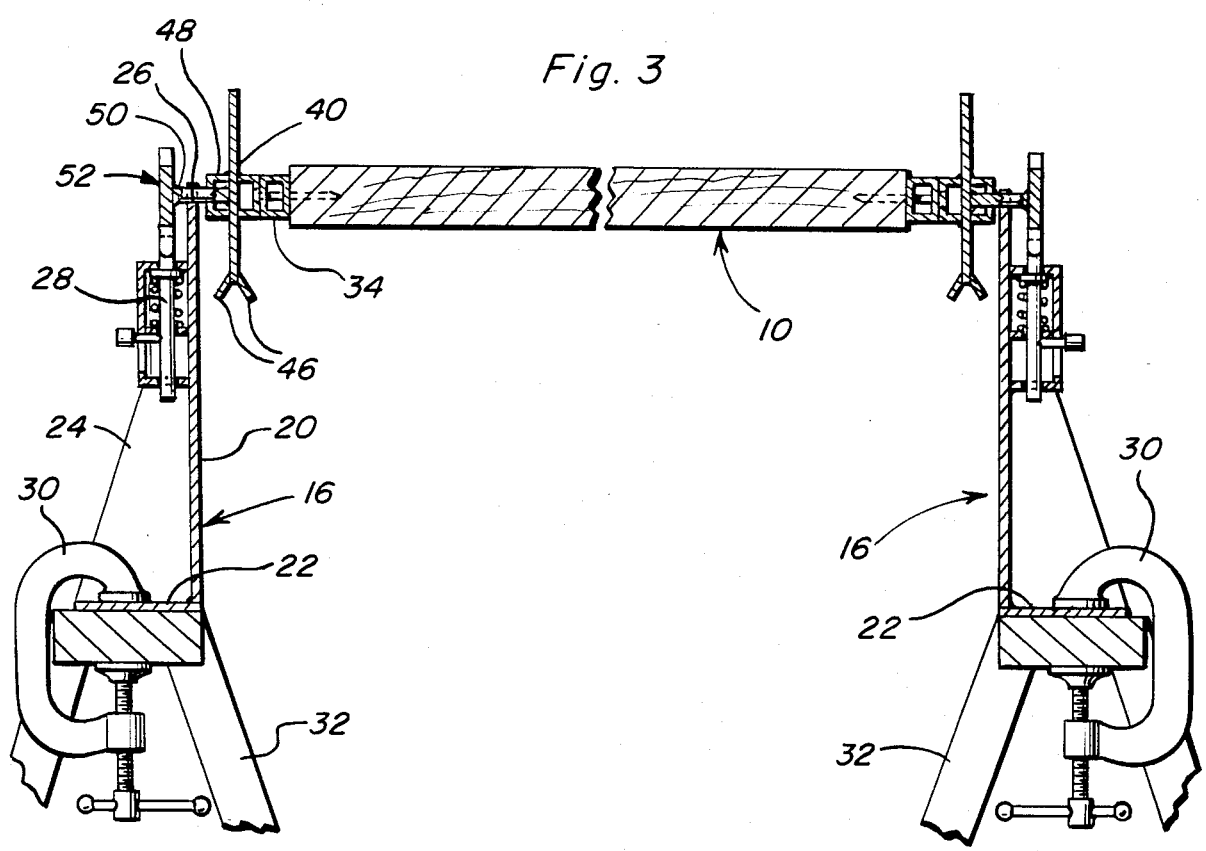
FIG. 3 is a fragmentary vertical sectional view taken substantially upon the plane indicated by the section line 3—3 of FIG. 2.

Each of the panel members 20 includes a notch 26 formed in its upper end portion defining a journal and a spring biased shiftably supported detent 28 is also supported from the upper portion of each panel member 20. As may be seen from FIGS. 1, 2 and 3 of the drawings, C-clamps 30 may be utilized to clamp the horizontal flanges 22 of the stands 16 atop conventional saw horses 32.

Each of the elongated members 18 includes a central bar portion 34 in the form of a tubular member having a plurality of longitudinally spaced transverse bores 36 formed therethrough by which suitable fasteners 38 may be used to secure the bar portions 34 of a pair of elongated members 18 along remote marginal edges 39 of an associated door 10. In addition, each elongated member 18 includes an edge upstanding plate 40 including a free upper edge 42 defining a rib edge and a free lower marginal edge 44 including a pair of downwardly divergent flanges 46 which define a downwardly opening trough or groove therebetween. Still further, the central portion of each plate or panel 40 includes a reinforcing bar 48 from which an outstanding shank portion 50 is supported and each shank portion 50 terminates outwardly in a peripherally notched disc 52. The shank portions 50 of the elongated members 18 secured to and extending along the marginal edges 39 of a door 10 may be cradled and rotatably supported in the journal notches 26 whereby the elongated members 18 and the associated door 10 may be rotated as desired. The detents 28 may be engaged in selected peripherally spaced notches formed in the discs 52 in order to retain the door 10 in the desired rotated position to have a refinishing operation performed thereon. It will be noted that the central bar portion 34 is spaced from the adjacent edges of the opposite side faces of the assoicated door 10 and it is to be understood that the elongated members 18 may also be constructed of plastic, if desired.

Figure 4:
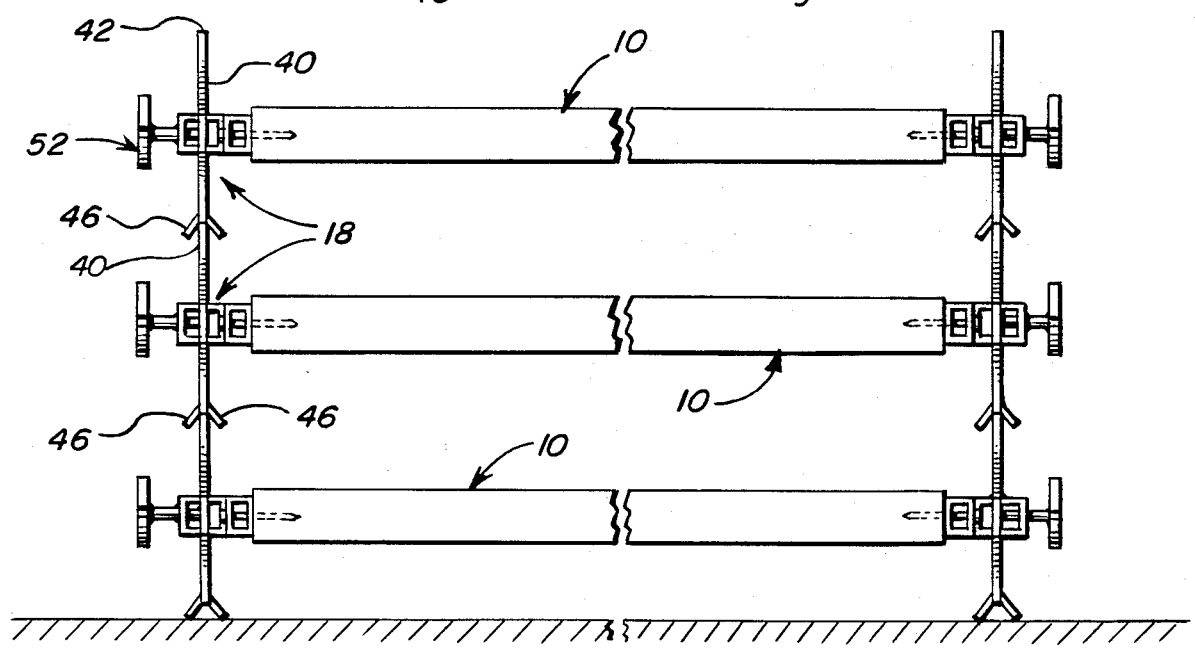
FIG. 4 is an elevational view illustrating the manner in which a plurality of panel members may be supported in vertically spaced stacked relation through utilization of the support structure of the instant invention.

After a refinishing operation has been performed on a door 10 supported from the saw horses 32, that door and the attached elongated members 18 may be removed from the stands 16 and stacked on the elongated members 18 secured to doors 10 having had the same or a different refinishing operation performed thereon, note the lower righthand portion of FIG. 1 and also FIG. 4. When the elongated members 18 of one door 10 are engaged with the elongated members 18 attached to another door 10, the rib edges 42 of one pair of plates 40 are received in the channels or grooves defined between the flanges 46 of the plates 40 of the other pair of elongated members.

The fasteners 38 may comprise thin shank headed nails or other suitable fasteners as desired. Further, it will be noted that the horizontal flanges of the stands 16 are of large plan area thereby enabling the stands 16 to be supported directly from the ground, if desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pair of support structures for supporting a panel member from opposite marginal edges thereof, said support structures each including an elongated member defining a central area adapted to abut, extend along and be removably anchored to one marginal edge of a panel member, said elongated members each including first and second means defining first and second remote marginal portions generally paralleling each other and extending longitudinally of the elongated member with said marginal portions spaced on opposite sides of said central area, one of said means defining ridges extending along said first marginal portions of said elongated members and facing outwardly of the latter way from the second marginal portions thereof and said second means defining troughs extending along said second marginal portions of the elongated members opening outwardly of the latter away from said first marginal portions, the ridges of said pair of support structures being receivable in troughs of a second pair of support structures anchored to remote edges of a second panel member, whereby said panel members may be supported relative to each other in generally horizontal spaced apart and stacked relation, a pair of horizontally spaced apart opposing stands, said stands including upper and lower ends, said lower ends of said stands including means for stationary support from a horizontal support surface, the upper end of said stands including means defining upwardly opening notches formed therein, said elongated members including mid-length oppositely outwardly projecting shank portions disposed normal to said elongated members and downwardly received and journalled in said notches, at least one of said shank portions including a laterally enlarged outer end portion, said outer end portion defining angularly displaced generally radially outwardly opening notches formed therein, said stand supporting said one shank portion including upwardly facing and downwardly retractable detent means seatingly engageable in a selected notch of the outer end portion when said selected notch is disposed lowermost.

* * * * *